(12) United States Patent  
Suzuki et al.

(10) Patent No.: US 7,430,089 B2  
(45) Date of Patent: Sep. 30, 2008

(54) DATA STORAGE DEVICE AND WRITE PROCESSING METHOD FOR DATA STORAGE DEVICE

(75) Inventors: Atsushi Suzuki, Kawasaki (JP); Takeshi Hara, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 11/182,643

(22) Filed: Jul. 15, 2005

(65) Prior Publication Data

US 2006/0203370 A1 Sep. 14, 2006

(30) Foreign Application Priority Data

Mar. 14, 2005 (JP) ............... 2005-071430

(51) Int. Cl.  
*G11B 21/02* (2006.01)

(52) U.S. Cl. ............... 360/75; 360/78.04; 360/78.06; 360/46; 360/65

(58) Field of Classification Search ............ None  
See application file for complete search history.

(56) References Cited

U.S. PATENT DOCUMENTS

| 5,345,342 | A | * | 9/1994 | Abbott et al. ................ 360/48 |
| 5,675,236 | A | * | 10/1997 | Nakanishi .................... 320/136 |
| 5,889,629 | A | * | 3/1999 | Patton, III ..................... 360/75 |
| 6,014,282 | A | * | 1/2000 | Ito ................................ 360/75 |
| 6,104,557 | A | * | 8/2000 | Kasai et al. ................... 360/46 |
| 6,396,652 | B1 | * | 5/2002 | Kawachi et al. ............... 360/75 |
| 6,407,480 | B1 | * | 6/2002 | Nakanishi et al. ...... 310/316.01 |
| 6,680,878 | B1 | * | 1/2004 | Minabe et al. ............ 369/24.01 |
| 6,859,340 | B2 | * | 2/2005 | Brittner et al. ................ 360/75 |
| 6,924,956 | B2 | * | 8/2005 | Kurihara ....................... 360/75 |
| 6,972,918 | B2 | * | 12/2005 | Kokami et al. ................ 360/75 |
| 7,039,821 | B1 | * | 5/2006 | Potega ......................... 713/340 |
| 7,215,497 | B2 | * | 5/2007 | Urata ........................... 360/53 |

FOREIGN PATENT DOCUMENTS

| JP | 02-154359 | 6/1990 |
| JP | 11-143788 | 5/1999 |
| JP | 2000-122813 | 4/2000 |
| JP | 2000122813 A * | 4/2000 |

\* cited by examiner

*Primary Examiner*—Hoa T. Nguyen  
*Assistant Examiner*—Dismery E Mercedes  
(74) *Attorney, Agent, or Firm*—Greer, Burns & Crain, Ltd.

(57) ABSTRACT

A data storage device executes sector guarantee processing at an unexpected power supply disconnection. The sector guarantee processing can be accurately performed even if the fluctuation of power supply voltage during normal operation is high. The voltage of the power supply is monitored via an A/D converter. The control unit calculates a voltage change value, which is a relative value of the detected voltage of the power supply, and judges power supply disconnection by the level of the voltage change value, to perform sector guarantee processing. The voltage fluctuation during normal operation and the voltage fluctuation at power supply disconnection can be distinguished, power supply disconnection can be accurately detected, and write disable status can be judged.

20 Claims, 6 Drawing Sheets

US 7,430,089 B2

DATA STORAGE DEVICE AND WRITE PROCESSING METHOD FOR DATA STORAGE DEVICE

CROSS-REFERENCE TO RELATED APPLICATIONS

This application is based upon and claims the benefit of priority from the prior Japanese Patent Application No. 2005-071430, filed on Mar. 14, 2005, the entire contents of which are incorporated herein by reference.

BACKGROUND OF THE INVENTION

1. Field of the Invention

The present invention relates to a data storage device for handling data in sector units and a write processing method for the data storage device, and more particularly to a data storage device for preventing not writing of everything which is generated by an unexpected power supply failure, and write processing method for the data storage device.

2. Description of the Related Art

Because of recent demands for the computerized processing of data, larger capacities are demanded for medium storage devices for storing data, such as magnetic disk devices and optical disk devices. Therefore the track density and the recording density of a disk medium are increasing more and more. In such a data storage device, data is recorded in sector units.

The data storage device for recording data in sector units operates by an external power supply, so if an unexpected power supply disconnection occurs during the recording of data, the write operation stops.

FIG. 7 is a diagram depicting a prior art. In the disk storage device, the write gate WG turns ON by the servo gate signal SG, and data is recorded in the interval between the servo gate signal. In this example, three sectors of data are recorded in the interval of the servo gate. If an unexpected power supply disconnection occurs at this time, voltage fluctuation starts, and when the voltage drops to a level where operation cannot be guaranteed, a reset is generated to stop the operation.

In this case, if a reset is generated in the middle of writing a sector in recording in sector units, the data is written in a part (shaded portion) of the sector, and operation stops, so an incomplete writing of the sector occurs, and a read error occurs when the power is recovered. In other words, the control circuit recognizes that the data was written in the sector by sending the data to the head in sector units, therefore the control unit cannot recognize the incomplete writing of the sector caused by the power supply disconnection.

FIG. 8 is a diagram depicting a conventional sector guarantee function. In the case of FIG. 7, for example, voltage fluctuation starts by an unexpected power supply disconnection, and when the voltage drops to a level where operation cannot be guaranteed, a reset is generated and the stop of operation is instructed. At this time, according to the first conventional sector guarantee method, the voltage holding circuit is installed so that if in the middle of writing to a sector, the entire sector is written and then operation stops by the voltage holding circuit (e.g. Japanese Patent Application Laid-Open No. H02-154359 (FIG. 1, FIG. 2)).

In the case of the proposal of the second sector guarantee method, a threshold voltage (e.g. 4.8V), which is higher than the reset voltage (e.g. 4.2V), is set with respect to the power supply voltage (e.g. 5V), and if the voltage becomes this threshold voltage or less, it is judged that a voltage drop occurred, and the operation stops when the writing to the sector completes (e.g. Japanese Patent Application Laid-Open No. 2000-122813 (FIG. 2)).

Because of recent demands for downsizing devices, such a disk storage device is also installed in compact servers and mobile equipment (e.g. notebook type personal computers and portable AV (Audio/Visual) equipment)). In such a device, in many cases the stability of the power supply is low. For example, in the case of a notebook type personal computer, a large capacity power supply may not be installed to downsize and decrease price. Also a notebook type personal computer may be driven by a small capacity battery.

Therefore with the first conventional sector guarantee method, where the data is guaranteed by hardware (voltage holding circuit), the prices of the data storage device and the device to which this data storage device is installed increase, and downsizing is also difficult.

In the case of the second conventional sector guarantee method, the setting of the threshold voltage of the external power supply is difficult if the power supply fluctuation is high, that is fluctuation is relatively high at low voltage, as described above. In particular if an absolute value is set, as described above, an adjustment is required for each device to be installed. This adjustment operation requires enormous labor for the millions of disk device which are manufactured, and induces a rise in device cost. If the threshold value is set as a predetermined value, on the other hand, an abnormality may be detected depending on the device to be installed, and the reliability of the device drops.

SUMMARY OF THE INVENTION

With the foregoing in view, it is an object of the present invention to provide a data storage device for implementing an accurate sector guarantee function without requiring an adjustment operation, even if the fluctuation of the power supply is high, and a write processing method for the data storage device.

It is another object of the present invention to provide a data storage device for implementing an accurate sector guarantee function even if any special hardware is not added, and a write processing method for the data storage device.

It is still another object of the present invention to provide a data storage device for automatically adjusting the judgment conditions according to the fluctuation of the power supply of the device, and a write processing method for the data storage device.

It is still another object of the present invention to provide a data storage device for effectively preventing abnormalities even if the fluctuation of the power supply is high, and a write processing method for the data storage device.

To achieve these objects, the data storage device of the present invention has a head for either reading or writing data on a storage medium, an actuator for positioning the head onto a desired track of the storage medium, an analog/digital converter for converting the power supply voltage to be supplied to the device into a digital value, and a control unit for writing write data on the storage disk in sector units using the head, and judging a power supply disconnection from the power supply voltage value converted into a digital value, and performing sector guarantee processing. And the control unit monitors the power supply voltage value converted into a digital value at a predetermined timing, calculates a voltage change value, and judges the power supply disconnection from the magnitude of the voltage change value.

The write processing method for a data storage device has a step of writing data on a storage medium in sector units using a head, a step of monitoring the output of an analog/ digital converter for converting the power supply voltage to be supplied to the device into a digital value at a predetermined timing, a step of calculating a voltage change value from the monitored power supply voltage value converted into a digital value, and a step of judging the power supply disconnection by a level of the voltage change value, and performing sector guarantee processing.

In the present invention, it is preferable that the control unit judges the power supply disconnection by comparing the voltage change value with a voltage judgment slice.

In the present invention, it is also preferable that the control unit judges whether the voltage change value is greater than the voltage judgment slice, and increases the voltage judgment slice when the voltage change value is greater than the voltage judgment slice, so as to learn the voltage judgment slice at power supply disconnection.

In the present invention, it is also preferable that the control unit judges whether the voltage change value is greater than the voltage judgment slice, and increments the error detection counter when the voltage change value is greater than the voltage judgment slice, and increases the voltage judgment slice when the error detection counter value is greater than a predetermined count slice value, so as to learn the voltage judgment slice at power disconnection.

In the present invention, it is also preferable that the control unit judges whether the voltage judgment slice exceeded a threshold slice, and judges as a power supply error when the voltage judgment slice exceeds the threshold slice.

In the present invention, it is also preferable that the control unit calculates the difference of the voltage values between the samples as the voltage change value.

In the present invention, it is also preferable that the control unit integrates the voltage values of a plurality of samples, and calculates the difference of the integrated values between the integration timings as the voltage change value.

In the present invention, it is also preferable that the control unit writes the write data on a storage disk as the storage medium in sector units using the head.

In the present invention, it is also preferable that the control unit monitors the power supply voltage of the analog/digital converter at a servo timing to acquire servo information from the storage disk.

In the present invention, it is also preferable that the control unit generates a write gate in sector units synchronizing with the servo timing.

In the present invention, a power supply disconnection is judged by the level of the voltage change value, which is a relative value of the detection voltage of the power supply, so the judgment is not affected by the voltage fluctuation during normal operation. Therefore the voltage fluctuation during normal operation and the voltage fluctuation at power supply disconnection can be distinguished, and a power supply disconnection can be accurately detected and the write disable status can be judged. Also this function can be implemented by firmware without installing special hardware, so the present invention can contribute to downsizing the device and decreasing price thereof.

DESCRIPTION OF THE PREFERRED EMBODIMENTS

Embodiments of the present invention will now be described in the sequence of the data storage device, sector guarantee processing at power supply disconnection, and other embodiments.

Data Storage Device

Figure 1:
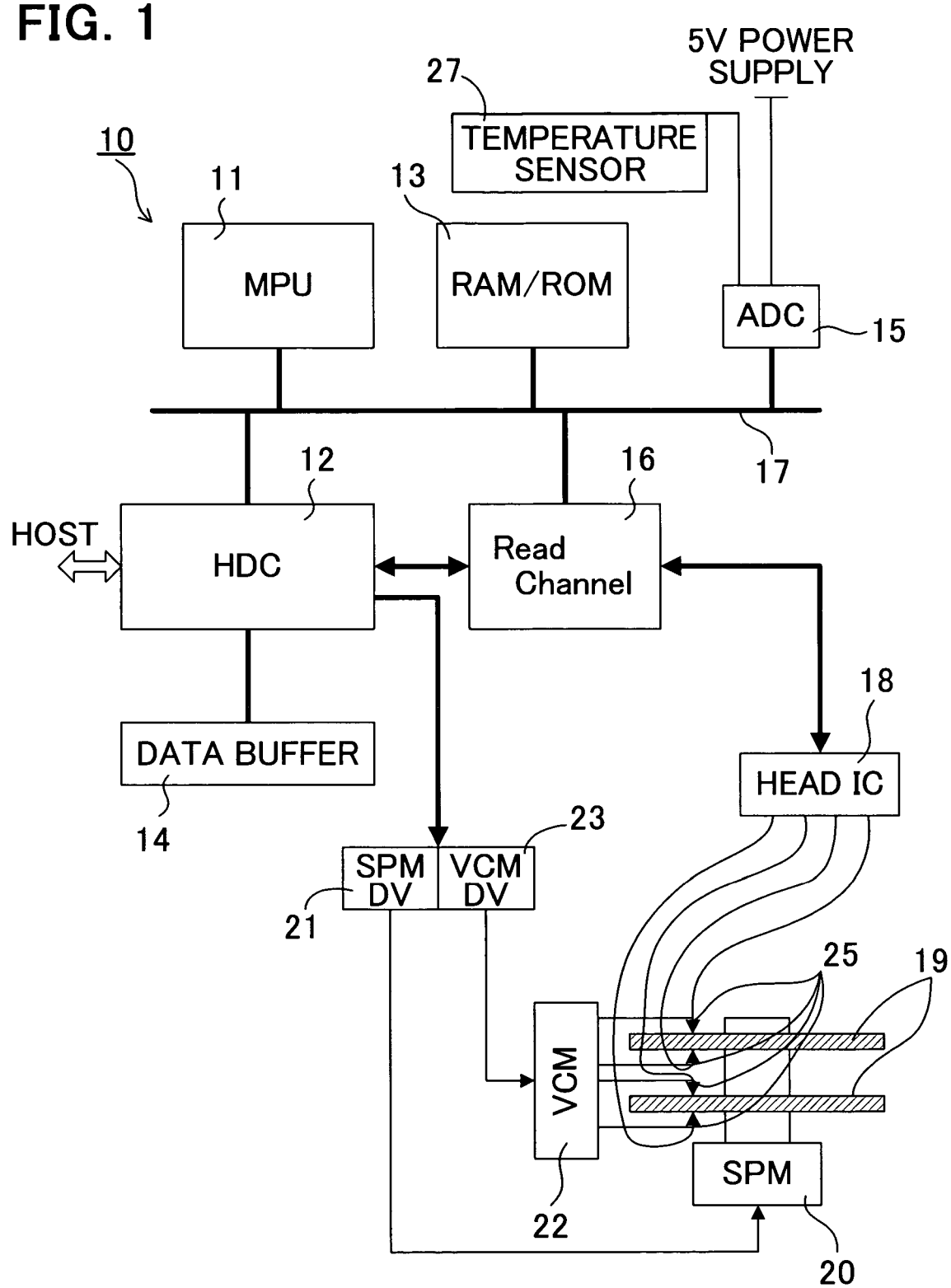
FIG. 1 is a block diagram depicting the data storage device according to an embodiment of the present invention.
Figure 2:
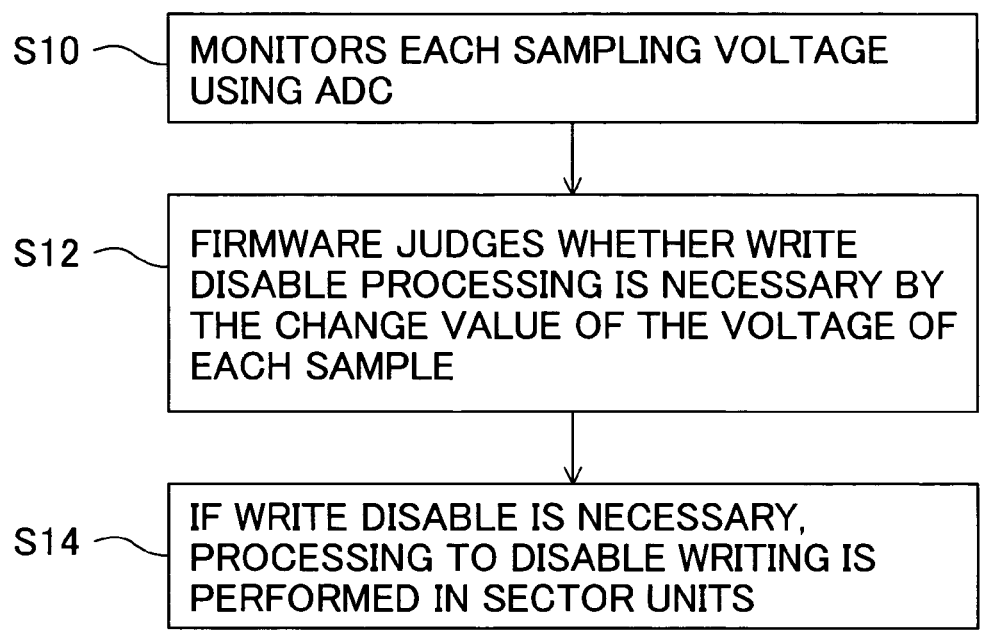
FIG. 2 is a flow chart depicting the write processing at power supply disconnection in FIG. 1.
Figure 3:
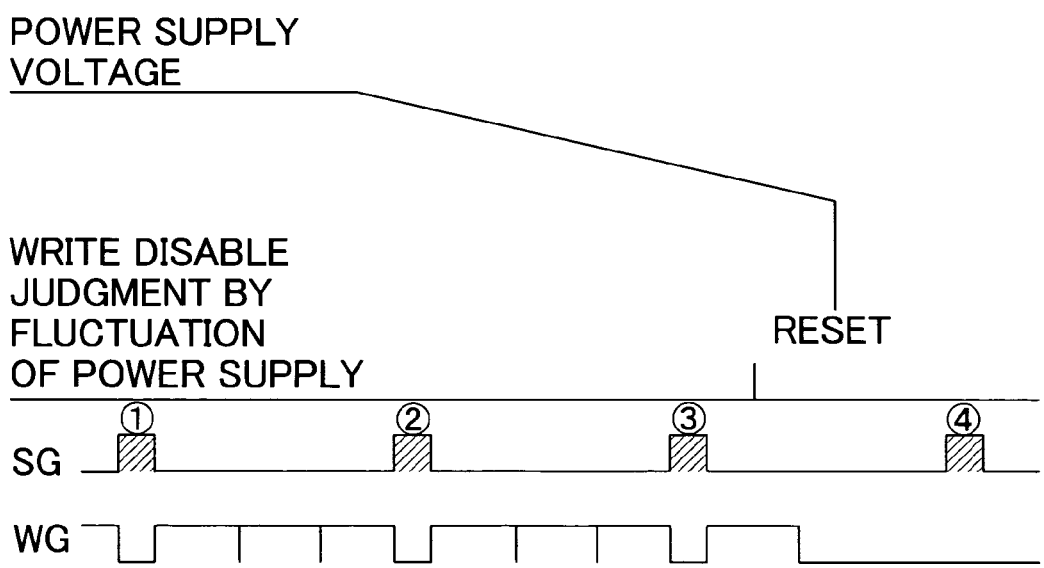
FIG. 3 is a timing chart depicting the write processing in FIG. 2.

FIG. 1 is a block diagram depicting the data storage device according to an embodiment of the present invention, FIG. 2 is a flow chart depicting the sector guarantee processing of the configuration in FIG. 1, and FIG. 3 is a timing chart depicting the sector guarantee processing in FIG. 2. FIG. 1 shows a magnetic disk device (HDD) for reading/writing the data on the magnetic disk, as an example of the data storage device.

As FIG. 1 shows, the magnetic disk device 10 is built into a personal computer, and is connected with the host (not illustrated) of the personal computer via an ATA (AT Attachment) standard interface cable (not illustrated), for example.

The magnetic disk device 10 has a magnetic disk 19, a spindle motor 20 for rotating the magnetic disk 19, a magnetic head 25 for reading/writing data on the magnetic disk 19, and an actuator (VCM) 22 for moving the magnetic head 25 in a radius direction (track crossing direction) of the magnetic disk 19.

The control unit has an HDC (Hard Disk Controller) 12, a data buffer 14, an MPU 11, a memory (RAM/ROM) 13, an analog/digital converter (ADC) 15, a read channel circuit 16, a head IC 18, a spindle motor driver 21, a VCM driver 23 and a bus 17 connecting these composing elements.

The HDC 12 has an interface control circuit having a task file for setting tasks from the host, and a data buffer control circuit for controlling the data buffer 14. The read channel circuit 16 controls the format of the read data and the write data, and also generates a read gate, write gate, read clock and write clock.

The data buffer 14 plays a role of cache memory, which saves the write data from the host and saves the read data from the magnetic disk 19. During write back, the write data in the data buffer 14 is written to the magnetic disk 19, and during reading, the read data in the data buffer 14 is transferred to the host.

The head IC 18 supplies the recording current to the magnetic head 25 according to the write data during writing, and amplifies the read signal from the magnetic head 25 and outputs it to the read channel circuit 16 during reading. The spindle motor driver 21 rotary-drives the spindle motor 20. The VCM driver 23 drives the VCM 22 for moving the magnetic head 25.

The MPU (Micro Processing Unit) 11 performs position control of the magnetic head 25, read/write control and retry control. The memory (ROM/RAM) 13 stores the data required for processing of the MPU 11. The ADC 15 converts the output of the temperature sensor 27 and the power supply voltage (5V), to be supplied to the device 10, into digital values at the sampling period of the MPU 11. The MPU 11 detects a power supply disconnection by the converted digital value of the power supply voltage, and performs sector guarantee processing.

FIG. 2 is a flow chart depicting the sector guarantee processing at power supply disconnection by the MPU 11, and FIG. 3 is the timing chart thereof.

(S10) The MPU 11 acquires the voltage value (digital value) of the ADC 15 at every sampling. In the magnetic disk device, as FIG. 3 shows, the MPU 11 acquires the servo information of the magnetic disk 19 from the read signal of the head 25 for each servo gate generated by the HDC 12, and performs firmware processing. Here the MPU 11 acquires the voltage value of the ADC 15 at the timing of the servo gate SG.

(S12) The MPU 11 calculates the difference (change value) of the voltage value of each sample, and judges whether write disable processing is necessary based on the level of the change value. In FIG. 3, for example, the change value of the voltages between the servo gate 2 and the servo gate 3 is large, so the MPU 11 judges this as write disable.

(S14) If it is judged as write disable, the MPU 11 notifies the write disable to the HDC 12 before reset. The HDC 12 turns OFF the write gate in sector units. And by this the sector guarantee function is activated.

Since the judgment is made based on the level of difference (change value) of the detected voltage of each sample in this way, that is based on the level of relative values, a power supply disconnection can be accurately detected and the necessity of write disable can be judged even if the power supply voltage fluctuates.

In the case of the second conventional sector guarantee method, on the other hand, the absolute value 4.8V is the threshold value while the power supply voltage is 5V, for example, that is the difference is 0.2V (200 mV), but this level of voltage fluctuation is possible due to a quantization error of the ADC 15 and the power supply fluctuation during normal operation, so error detection is possible. To prevent this, the threshold must be adjusted to 4.6V, for example, for the second conventional sector guarantee method according to the power supply fluctuation of the device.

In the present invention, judgment is based on the level of the relative value of the detected voltage, so the influence of the voltage fluctuation during normal operation is not received. Therefore the voltage fluctuation during normal operation and the voltage fluctuation at power supply disconnection can be distinguished, and the power supply disconnection can be accurately detected, and on whether the necessity of write disable can be judged. Also unlike the first conventional sector guarantee method, the sector guarantee processing can be implemented by firmware without installing special hardware, which contributes to downsizing and decreasing the price of the device.

Sector Guarantee Processing at Power Supply Disconnection

Figure 4:
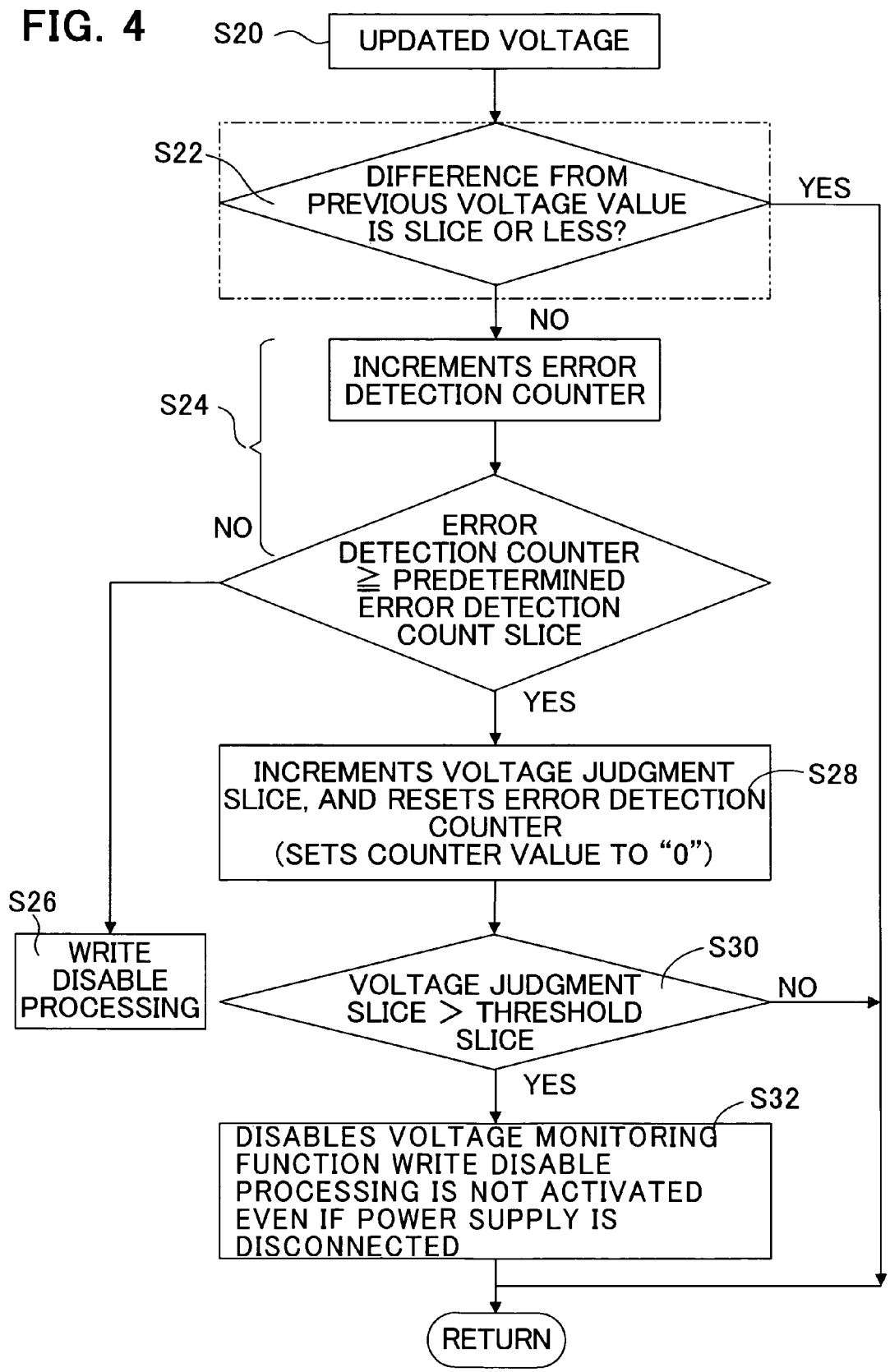
FIG. 4 is a flow chart depicting the write processing according to an embodiment of the present invention.
Figure 5:
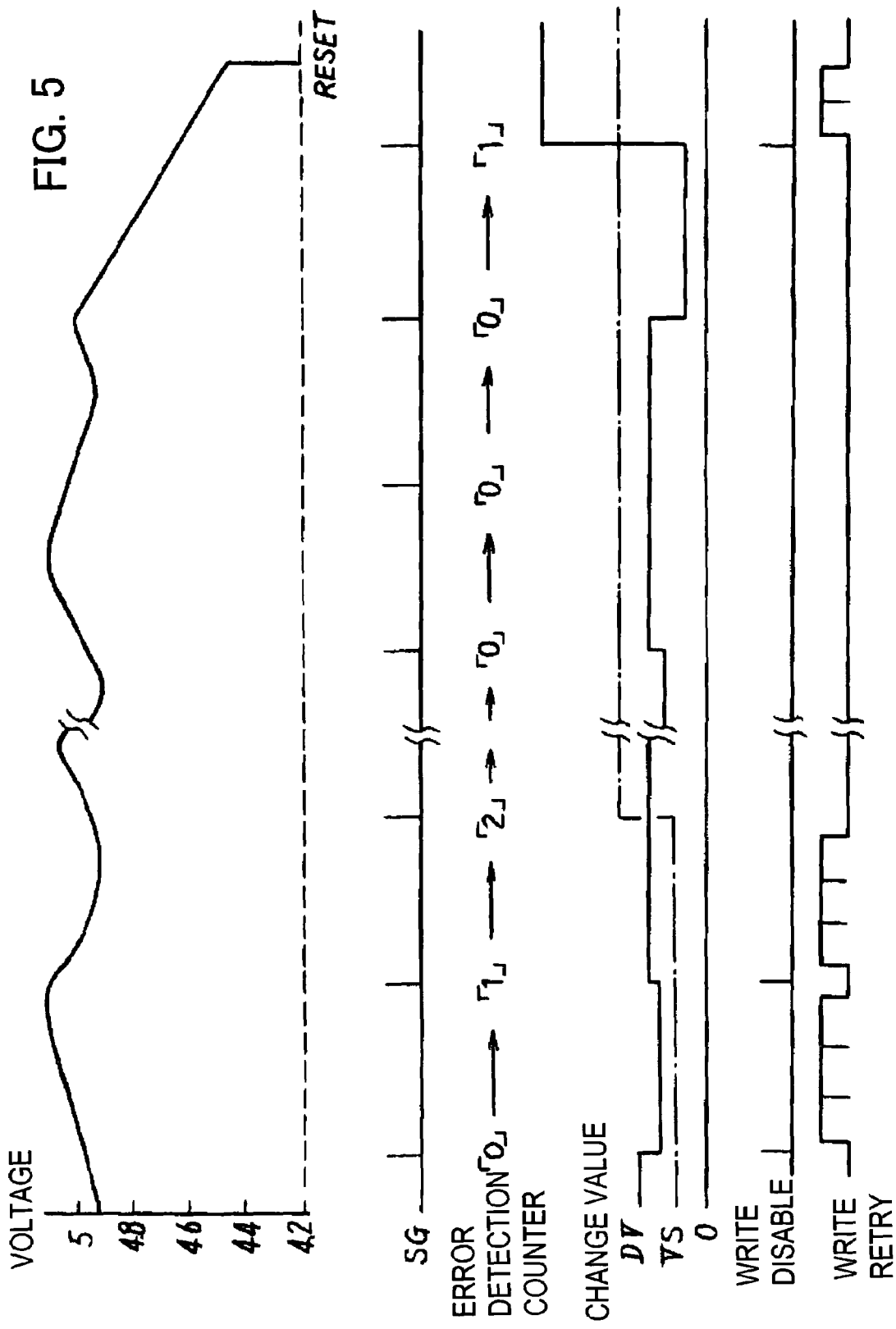
FIG. 5 is a timing chart depicting the write processing in FIG. 4.

FIG. 4 is a flow chart depicting the sector guarantee processing at power supply disconnection according to an embodiment of the present invention, and FIG. 5 is a timing chart of the operation in FIG. 4.

(S20) The MPU 11 acquires the voltage value (digital value) of the ADC 15 for each sampling. In the magnetic disk device, as shown in FIG. 3 and FIG. 5, the MPU 11 acquires the servo information of the magnetic disk 19 from the read signal of the head 25 for each servo gate generated by the HDC 12, and performs firmware processing. Here the MPU 11 acquires the voltage value of the ADC 15 at the timing of the servo gate SG.

(S22) The MPU 11 calculates the difference (change value) DV of the voltage value of each sample, and judges whether the change value DV is the voltage judgment slice VS (see FIG. 5) or less. If the change value is equal to or less than the slice, this processing ends.

(S24) If the change value DV is not the slice VS or less, on the other hand, the MPU 11 increments the error detection counter by "1". This error detection counter is installed to judge whether error detection of a power supply disconnection is generated by this voltage judgment slice. And the MPU 11 judges whether the error detection counter value is the error detection count slice value ("2" in FIG. 5) or more.

(S26) If the error detection counter value is not the error detection count slice value or more, write disable processing is performed.

(S28) If the error detection counter value is the error detection count slice value or more, on the other hand, the MPU 11 increments the voltage judgment slice VS. The voltage judgment slice is learned so as to be changed depending on the type of the power supply fluctuation. And the error detection counter is reset (counter value is set to "0").

(S30) Then the MPU 11 judges whether the voltage judgment slice VS exceeds the threshold slice. This threshold slice is the slice at the threshold of detecting the power supply disconnection, and the threshold slice is set because the fluctuation of the power supply disconnection cannot be detected if the voltage judgment slice is too high. If the voltage judgment slice VS does not exceed the threshold slice, this sampling processing ends.

(S32) If the voltage judgment slice VS exceeds the threshold slice, on the other hand, the power supply disconnection cannot be detected, so the voltage monitoring function (this processing) of the MPU 11 is disabled, so that the write disable processing is not activated even if the power supply is disconnected. In other words, an error is notified to the host since the fluctuation of the power supply is too high and it is quite possible that the power supply is abnormal.

This processing will be described with reference to FIG. 5. To judge the level of the above mentioned change value, the voltage judgment slice is used to simplify the processing. As described above, this value of the voltage judgment slice must be determined based on the normal fluctuation value of the power supply depending on the type of the power supply.

In this embodiment, the voltage judgment slice is first set to a low level first, and the fluctuation value of the power supply in normal operation is learned, and then it is automatically set to an appropriate voltage judgment slice with which the power supply disconnection can be detected without judging as a write disable necessary by the voltage fluctuation of the power supply in normal operation.

According to FIG. 5, the voltage judgment slice VS is the minimum at power ON, and the voltage fluctuation value between the samples is greater than the voltage judgment slice VS, so the error detection counter is incremented since an error detection would be generated with this voltage judgment slice. And if the error detection counter is the error detection count slice or less, the write disable processing is performed.

In this write disable processing, the HDC 12 can execute retry since the power supply is not disconnected. If the error detection counter is the error detection count slice or more, the voltage judgment slice VS is incremented since an error detection is generated by this voltage judgment slice. In this way, as time elapses, the voltage judgment slice VS is no longer affected by the voltage fluctuation of the power supply during normal operation. Therefore the write disable is generated several times at power ON, which has little affect on performance.

In other words, the voltage judgment slice VS is learned to be the change value for detecting the power supply disconnection, and the write disable processing is not executed after learning, and only the voltage fluctuation value at power supply detection is detected. In other words, in the write disable processing at power supply disconnection, the HDC 12 performs sector guarantee processing.

Error detection is counted by the error detection counter because the fluctuation pattern changes depending on the type of the power supply (e.g. frequency of fluctuation), so if the voltage judgment slice is changed by one voltage change value, a detection error may occur to the conditions of changing the voltage judgment slice.

Other Embodiments

Figure 6:
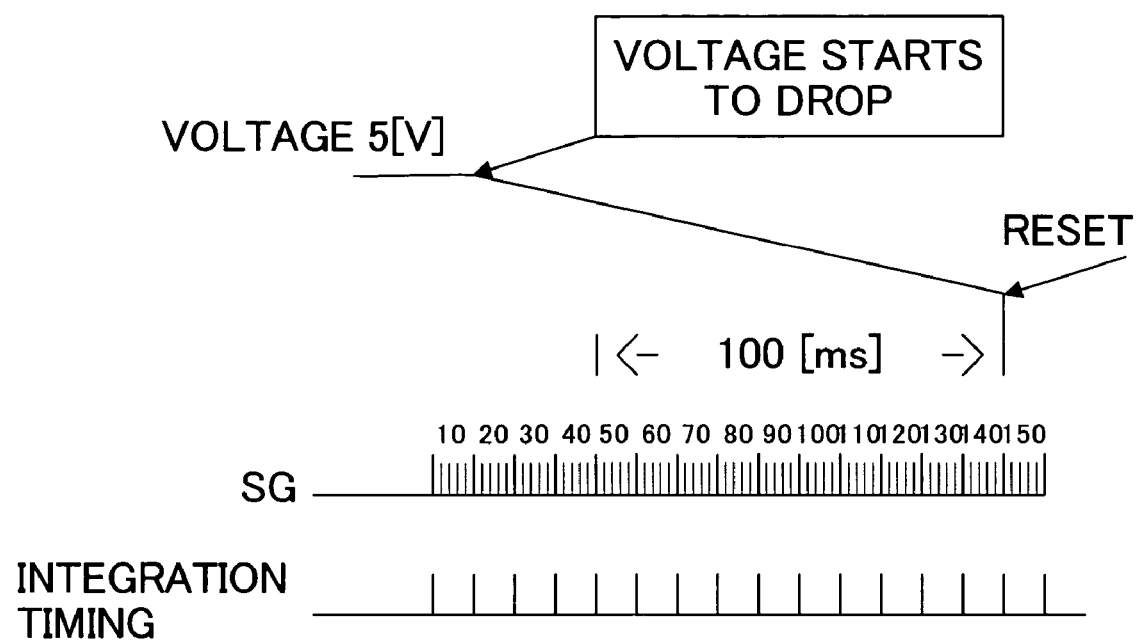
FIG. 6 is a diagram depicting the write processing according to another embodiment of the present invention.
Figure 7:
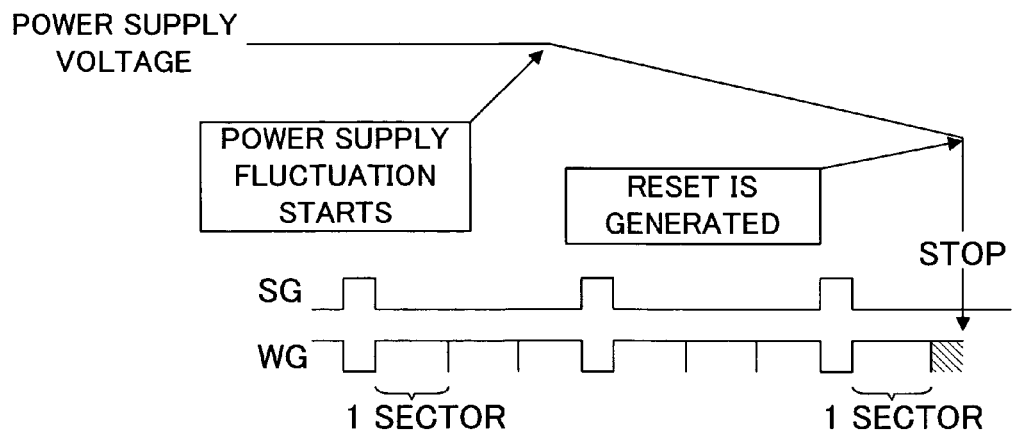
FIG. 7 is a diagram depicting the write processing at power supply disconnection according to a prior art.
Figure 8:
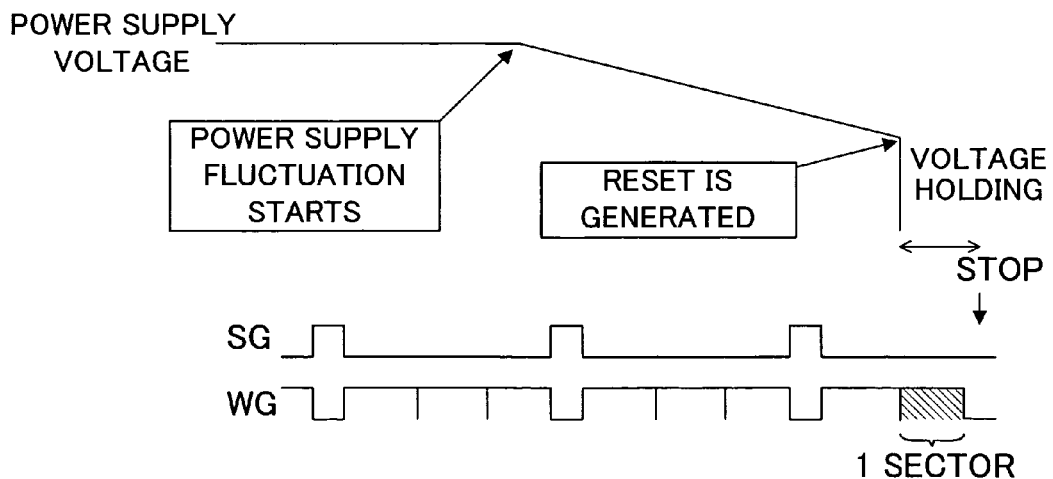
FIG. 8 is a diagram depicting the sector guarantee processing at power supply disconnection according to a prior art.

FIG. 6 is a time chart depicting the write processing at power supply disconnection according to another embodiment of the present invention. This embodiment shows the processing for a power supply of which the voltage change at power supply disconnection is slow. In the case of the embodiments in FIG. 4 and FIG. 5, the change value is calculated for each servo gate SG, and the necessity of write disable is judged, so this is suitable for the case when the voltage change at power supply disconnection is quick.

In the case of a power supply of which the voltage change at power supply disconnection is slow, on the other hand, it is possible that the voltage change value in one sample interval during normal operation and the voltage change value in one sample interval at power supply disconnection have no difference, so the voltage change values for a plurality of intervals are integrated and the change value between these integrated values is calculated and compared with the voltage judgment slice. Here the change values for 10 samples (servo gates) are integrated.

Since the voltage change value of the power supply during normal operation is averaged, this does not affect the update of the voltage judgment slice. Therefore even in the case when a power supply of which the voltage change at power supply disconnection is slow, a power supply disconnection by a voltage drop can be detected.

Also by combining the example in FIG. 4 and the example in FIG. 6, an automatic learning function can be provided to each device of which the pattern of the voltage drop at power supply disconnection is different.

In the above embodiments, a magnetic disk device was described as an example of the data storage device, but the present invention can be applied to an optical disk, a magneto-optical disk, and to other storage media on which data is stored in sector units. The interface is not limited to ATA, but other interfaces may be used. And the power supply voltage is not limited to 5V, but may be another value.

The present invention was described above using embodiments, but the present invention can be modified in various ways within the scope of the essential character of the present invention, and these shall not be excluded from the scope of the present invention.

Since a power supply disconnection is judged based on the level of the voltage change value, that is, a relative value of the detected voltage of the power supply, the influence of the voltage fluctuation during normal operation is not received. Therefore the voltage fluctuation during normal operation and the voltage fluctuation at power supply disconnection can be distinguished, and a power supply disconnection can be accurately detected and write disable can be judged. The present invention can be implemented by firmware without installing special hardware, which contributes to downsizing and decreases the cost of the data storage device.

What is claimed is:

1. A data storage device comprising:
   a head for either reading or writing data on a storage medium;
   an actuator for positioning said head on a desired track of said storage medium;
   an analog/digital converter for converting power supply voltage values to be supplied to the device into digital values; and
   a control unit for controlling writing of write data on said storage medium in sector units using said head, and judging a power supply disconnection based on said power supply voltage values converted into digital values and performing sector guarantee processing,
   wherein said control unit monitors said power supply voltage values converted into digital values at each predetermined timing, calculates a voltage change value between said monitored voltage values at each predetermined timing, and judges said power supply disconnection from the level of said voltage change value.

2. The data storage device according to claim 1,
   wherein said control unit judges said power supply disconnection by comparing said voltage change value with a voltage judgment slice.

3. The data storage device according to claim 1,
   wherein said control unit calculates the difference of voltage values between the samples as said voltage change value.

4. The data storage device according to claim 1,
   wherein said control unit controls writing of the write data on a storage disk as said storage medium in said sector units using said head.

5. The data storage device according to claim 1, wherein said control unit monitors said power supply voltage values of said analog/digital converter at a servo timing to acquire servo information from said storage disk.

6. The data storage device according to claim 5,
   wherein said control unit generates a write gate in said sector units synchronizing said servo timing.

7. A data storage device comprising:
   a head for either reading or writing data on a storage medium;
   an actuator for positioning said head on a desired track of said storage medium;
   an analog/digital converter for converting power supply voltage values to be supplied to the device into digital values; and
   a control unit for controlling writing of write data on said storage medium in sector units using said head, and judging a power supply disconnection based on said power supply voltage values converted into digital values and performing sector guarantee processing,
   wherein said control unit monitors said power supply voltage values converted into digital values at each predetermined timing, calculates a voltage change value between said monitored voltage values at each predetermined timing, and judges said power supply disconnection from the level of said voltage change value,
   wherein said control unit judges said power supply disconnection by comparing said voltage change value with a voltage judgment slice, and
   wherein said control unit judges whether said voltage change value is greater than the voltage judgment slice, and increases said voltage judgment slice so as to learn the voltage judgment slice at power supply disconnection when said voltage change value is greater than said voltage judgment slice.

8. The data storage device according to claim 7, wherein said control unit judges whether said voltage judgment slice exceeded a threshold slice, and judges as a power supply error when said voltage judgment slice exceeds said threshold slice.

9. A data storage device comprising:
a head for either reading or writing data on a storage medium;
an actuator for positioning said head on a desired track of said storage medium; an analog/digital converter for converting power supply voltage values to be supplied to the device into digital values; and
a control unit for controlling writing of write data on said storage medium in sector units using said head, and judging a power supply disconnection based on said power supply voltage values converted into digital values and performing sector guarantee processing,
wherein said control unit monitors said power supply voltage values converted into digital values at each predetermined timing, calculates a voltage change value between said monitored voltage values at each predetermined timing, and judges said power supply disconnection from the level of said voltage change value,
wherein said control unit judges said power supply disconnection by comparing said voltage change value with a voltage judgment slice, and
wherein said control unit judges whether said voltage change value is greater than the voltage judgment slice, and increments an error detection counter when said voltage change value is greater than said voltage judgment slice, and increases said voltage judgment slice when the error detection counter value is greater than a predetermined count slice value so as to learn the voltage judgment slice at power supply disconnection.

10. A data storage device comprising:
a head for either reading or writing data on a storage medium;
an actuator for positioning said head on a desired track of said storage medium;
an analog/digital converter for converting power supply voltage values to be supplied to the device into digital values; and
a control unit for controlling writing of write data on said storage medium in sector units using said head, and judging a power supply disconnection based on said power supply voltage values converted into digital values and performing sector guarantee processing,
wherein said control unit monitors said power supply voltage values converted into digital values at each predetermined timing, calculates a voltage change value between said monitored voltage values at each predetermined timing, and judges said power supply disconnection from the level of said voltage change value, and
wherein said control unit integrates said voltage values of a plurality of samples, and calculates the difference of said integrated values between integration timings as said voltage change value.

11. A write processing method for a data storage device, comprising the steps of:
writing data on a storage medium in sector units using a head;
monitoring the output of an analog/digital converter for converting power supply voltage values to be supplied to the device into digital values at a predetermined timing;
calculating a voltage change value between said monitored voltage values at each predetermined timing from said monitored power supply voltage values converted into digital values; and
judging power supply disconnection by the level of said voltage change value and performing sector guarantee processing.

12. The write processing method for a data storage device according to claim 11,
wherein said step of judging the power supply disconnection comprises a step of judging said power supply disconnection by comparing said voltage change value with a voltage judgment slice.

13. The write processing method for a data storage device according to claim 11,
wherein said step of calculating the voltage change value comprises a step of calculating the difference of voltage values between the samples.

14. The write processing method for a data storage device according to claim 11,
wherein said write step comprises a step of writing write data on a storage disk as said storage medium in said sector units using said head.

15. The write processing method for a data storage device according to claim 11,
wherein said monitoring step comprises a step of monitoring said power supply voltage values of said analog/digital converter at a servo timing to acquire servo information from said storage disk.

16. The write processing method for a data storage device according to claim 15,
wherein said write step further comprises a step of generating a write gate in said sector units synchronizing said servo timing.

17. A write processing method for a data storage device, comprising the steps of:
writing data on a storage medium in sector units using a head;
monitoring the output of an analog/digital converter for converting power supply voltage values to be supplied to the device into digital values at a predetermined timing;
calculating a voltage change value between said monitored voltage values at each predetermined timing from said monitored power supply voltage values converted into digital values;
judging power supply disconnection by the level of said voltage change value and performing sector guarantee processing, wherein said step of judging the power supply disconnection includes a step of judging said power supply disconnection by comparing said voltage change value with a voltage judgment slice,
a step of judging whether said voltage change value is greater than the voltage judgment slice; and
a step of increasing said voltage judgment slice when said voltage change value is greater than said voltage judgment slice, so as to learn the voltage judgment slice at power supply disconnection.

18. The write processing method for a data storage device according to claim 17, further comprising:
a step of judging whether said voltage judgment slice exceeded a threshold slice; and
a step of judging as a power supply error when said voltage judgment slice exceeds said threshold slice.

19. A write processing method for a data storage device, comprising the steps of:
- writing data on a storage medium in sector units using a head;
- monitoring the output of an analog/digital converter for converting power supply voltage values to be supplied to the device into digital values at a predetermined timing;
- calculating a voltage change value between said monitored voltage values at each predetermined timing from said monitored power supply voltage values converted into digital values;
- judging power supply disconnection by the level of said voltage change value and performing sector guarantee processing, wherein said step of judging the power supply disconnection includes a step of judging said power supply disconnection by comparing said voltage change value with a voltage judgment slice,
- a step of judging whether said voltage change value is greater than the voltage judgment slice;
- a step of incrementing an error detection counter when said voltage change value is greater than said voltage judgment slice; and
- a step of increasing said voltage judgment slice when said error detection counter value is greater than a predetermined count slice value, so as to learn the voltage judgment slice at power supply disconnection.

20. A write processing method for a data storage device, comprising the steps of:
- writing data on a storage medium in sector units using a head;
- monitoring the output of an analog/digital converter for converting power supply voltage values to be supplied to the device into digital values at a predetermined timing;
- calculating a voltage change value between said monitored voltage values at each predetermined timing from said monitored power supply voltage values converted into digital values; and
- judging power supply disconnection by the level of said voltage change value and performing sector guarantee processing,
- wherein said step of calculating said voltage change value further comprises:
- a step of integrating said voltage values of a plurality of samples; and
- a step of calculating the difference of said integrated values between integration timings.

* * * * *